D. W. TURNER.
MACHINE FOR SETTING SAWS.

No. 187,940. Patented Feb. 27, 1877.

ATTEST:
Daniel Smullen
M. Clark

INVENTOR:
David W. Turner

UNITED STATES PATENT OFFICE.

DAVID W. TURNER, OF ST. LOUIS, MISSOURI.

IMPROVEMENT IN MACHINES FOR SETTING SAWS.

Specification forming part of Letters Patent No. 187,940, dated February 27, 1877; application filed November 4, 1876.

*To all whom it may concern:*

Be it known that I, DAVID W. TURNER, of the city and county of St. Louis, and State of Missouri, have invented a certain Improved Machine for Setting Saws, of which the following specification is a full, clear, and exact description, reference being had to the accompanying drawings.

My invention consists in a machine provided with spring-hammers for setting the teeth of saws, and having provisions for adjusting the saw, and for automatically feeding the same to the hammer, as will hereinafter more fully appear.

Figure 1:
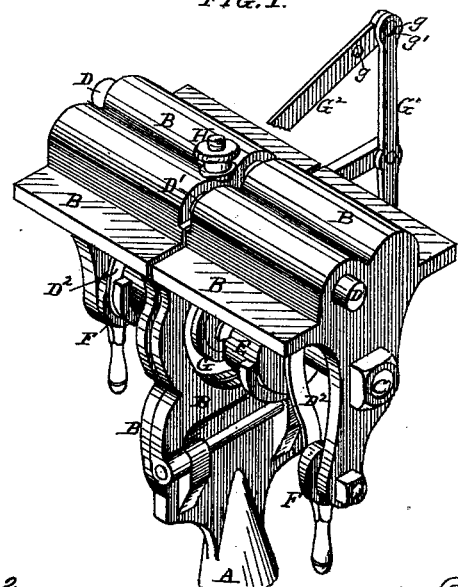
Figure 2:
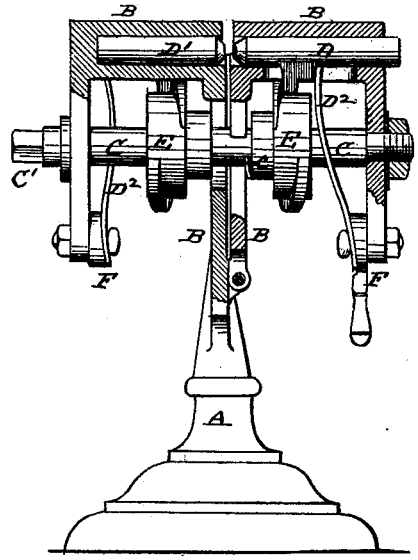
Figure 3:
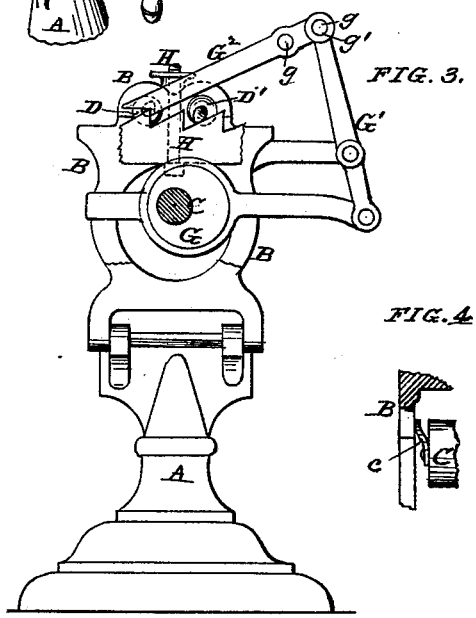
Figure 4:
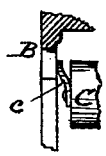

In the drawings, Figure 1 is a perspective view; Fig. 2 is a longitudinal section; Fig. 3 is a transverse section; Fig. 4 is a detail of cam.

A is the base of the machine, to which the hammer-housing B is secured. The housing B is made in two parts, hinged together so that when the hammer is about to strike the teeth of the saw the said parts will close and clamp the saw between them, this closing of the parts being accomplished by the spring-projection $c$ on the driving-shaft C. C' is a hand-crank, by which the machine is operated. D are the hammers; $D^1$, the anvils; and $D^2$ the springs that impel the hammers in striking. E are cams on the main shaft C, by which the hammers are retracted. The springs may be of any suitable construction and arranged in any manner described, and a turn plate or cam, F, is provided for each spring, for the purpose of regulating the tension of the spring, and also to hold it out of action when desired. The face of the hammers and anvils are beveled to suit the set required in the saw-teeth. On the main shaft C is an eccentric or cam, G, the rod of which is connected to a pivoted lever, $G^1$, carrying a dog, $G^2$, which, after each blow, advances the saw a distance of two teeth. The dog $G^2$ has two pivot-holes, $g$, to which its pivot-bolt $g'$ can be changed, so as to bring the saw-teeth in line with either of the hammers, as desired. H is an adjustable stirrup, on which the saw-blade rests, and by means of which the saw-blade is vertically adjusted, in order that the amount of "set" given to the saw-teeth can be regulated.

The action of my machine is to set each alternate tooth of the saw in one direction, and then to set the remaining alternate teeth in the other direction, and in order to accomplish this one hammer will be made inactive (by turn-plate F) while the other is striking or setting the teeth.

I claim as my invention—

1. The hammer D, impelled in its blow by a spring, $D^2$, in combination with the anvil $D^1$ and operating-cam E, as and for the purpose set forth.

2. The duplicate hammers D, anvils $D^1$, and springs $D^2$, in combination with the operating-cams E, crank C', and shaft C, as and for the purpose set forth.

3. The housing B, made in two parts, in combination with spring-projection $c$, and driving shaft C, as and for the purpose set forth.

D. W. TURNER.

Witnesses:
DANIEL SMULLER,
ANTON FREITAG.